US011409025B2

(12) United States Patent
Kimura et al.

(10) Patent No.: US 11,409,025 B2
(45) Date of Patent: Aug. 9, 2022

(54) FUNCTIONAL SHEET

(71) Applicants: MITSUBISHI GAS CHEMICAL COMPANY, INC., Tokyo (JP); MGC FILSHEET CO., LTD., Saitama (JP)

(72) Inventors: Hideaki Kimura, Tokorozawa (JP); Masayuki Akaki, Tokorozawa (JP); Kenta Nonaka, Osaka (JP); Takashi Fujii, Tokorozawa (JP); Katsuyuki Murai, Tokyo (JP); Shotaro Ohno, Tokyo (JP)

(73) Assignees: MITSUBISHI GAS CHEMICAL COMPANY, INC., Tokyo (JP); MGC FILSHEET CO., LTD., Saitama (JP)

( * ) Notice: Subject to any disclaimer, the term of this patent is extended or adjusted under 35 U.S.C. 154(b) by 167 days.

(21) Appl. No.: 16/629,782

(22) PCT Filed: Jul. 5, 2018

(86) PCT No.: PCT/JP2018/025435
§ 371 (c)(1),
(2) Date: Jan. 9, 2020

(87) PCT Pub. No.: WO2019/013078
PCT Pub. Date: Jan. 17, 2019

(65) Prior Publication Data
US 2020/0174159 A1    Jun. 4, 2020

(30) Foreign Application Priority Data
Jul. 10, 2017    (JP) .............................. JP2017-134634

(51) Int. Cl.
| | |
|---|---|
| G02B 1/04 | (2006.01) |
| G02B 1/14 | (2015.01) |
| B29D 11/00 | (2006.01) |
| B32B 7/12 | (2006.01) |
| B32B 27/08 | (2006.01) |
| B32B 27/30 | (2006.01) |
| B32B 27/34 | (2006.01) |
| B29C 45/14 | (2006.01) |
| B29K 77/00 | (2006.01) |

(52) U.S. Cl.
CPC .......... *G02B 1/04* (2013.01); *B29D 11/00009* (2013.01); *B32B 7/12* (2013.01); *B32B 27/08* (2013.01); *B32B 27/306* (2013.01); *B32B 27/34* (2013.01); *G02B 1/14* (2015.01); *B29C 45/14* (2013.01); *B29K 2077/00* (2013.01); *B32B 2307/412* (2013.01); *B32B 2307/42* (2013.01); *B32B 2551/00* (2013.01)

(58) Field of Classification Search
CPC ......... B32B 7/12; B32B 27/08; B32B 27/306; B32B 27/34; B32B 2307/412; B32B 2307/42; B32B 2551/00
See application file for complete search history.

(56) References Cited

U.S. PATENT DOCUMENTS

| | | | |
|---|---|---|---|
| 2007/0148482 | A1 | 6/2007 | Fujinaka et al. |
| 2007/0286969 | A1 | 12/2007 | Nagpal et al. |
| 2008/0094707 | A1* | 4/2008 | Tsukane ................ B32B 27/08 |
| | | | 359/507 |
| 2009/0305049 | A1 | 12/2009 | Kobuchi et al. |
| 2012/0147319 | A1 | 6/2012 | Corti et al. |
| 2018/0203258 | A1 | 7/2018 | Souma et al. |
| 2020/0218090 | A1 | 7/2020 | Souma et al. |

FOREIGN PATENT DOCUMENTS

| | | |
|---|---|---|
| CN | 101598831 A | 12/2009 |
| EP | 1 804 094 A1 | 7/2007 |
| JP | 49-131456 | 12/1974 |
| JP | 64-9238 | 1/1989 |
| JP | 1-156716 | 6/1989 |
| JP | 6-297660 | 10/1994 |
| JP | 8-313701 | 11/1996 |
| JP | 2002-6924 | 1/2002 |
| JP | 2006-227591 A | 8/2006 |
| JP | 2009-540064 | 11/2009 |
| JP | 4739950 | 8/2011 |
| JP | 2013-546027 | 12/2013 |
| WO | 93/14266 | 7/1993 |
| WO | 2006/040954 A1 | 4/2006 |
| WO | 2017/010218 A1 | 1/2017 |

OTHER PUBLICATIONS

English machine translation of JP2006227591, Aug. 31, 2006 (Year: 2006).*

(Continued)

*Primary Examiner* — Michael C Miggins
(74) *Attorney, Agent, or Firm* — Greenblum & Bernstein, P.L.C.

(57) ABSTRACT

Provided is a functional polyamide sheet in which air bubbles are not generated or are reduced in a polarizing and/or photochromic functional sheet when the polarizing and/or photochromic functional sheet are/is manufactured using a sheet or film formed by a polyamide resin as a protective layer, and a functional polyamide lens using the functional polyamide sheet.

Provided are a polyamide functional sheet obtained by disposing a protective layer formed by a transparent plastic sheet or film on at least one surface of a functional layer, which is a polyvinyl alcohol-based polarizing film layer, a photochromic layer, or a combination of these layers, with an adhesive layer being interposed therebetween, in which the protective layer is a sheet or film formed by a polyamide resin, and an oxygen transmission rate at 23° C. and 85% RH is 50 cm³/m²·24 hr·bar or more, and a functional polyamide lens using the polyamide functional sheet.

5 Claims, No Drawings

(56) References Cited

OTHER PUBLICATIONS

Official Communication issued in International Patent Application No. PCT/JP2018/025435, dated Oct. 9, 2018.
Extended European Search Report issued in European Patent Application No. 18832158.2 dated Mar. 1, 2021.
Office Action issued in Chinese Patent Application No. 201880040533.9 dated Apr. 2, 2021, along with English translation thereof.

* cited by examiner

FUNCTIONAL SHEET

TECHNICAL FIELD

The present invention relates to a functional sheet for sunglasses in which a protective layer formed by a transparent plastic sheet or film is laminated on at least one surface of a functional layer, which is a polyvinyl alcohol-based polarizing film layer, a photochromic layer, or a combination of these layers, with an adhesive layer being interposed there between, and a functional lens for sunglasses.

BACKGROUND ART

A functional sheet is obtained by laminating a transparent plastic sheet or film, particularly, an aromatic polycarbonate resin sheet or the like on a polarizing film, which is obtained by dyeing a polyvinyl alcohol-based film (hereinafter, PVA) with a dichroic dye, a photochromic layer in which a photochromic dye is dispersed in a matrix resin, or a functional layer obtained by combining the polarizing film and the photochromic layer, by using a two-component thermosetting resin or the like as an adhesive. The functional sheet is subjected to heat bending, and then, from the viewpoint of improving durability, the heat-bent product is inserted into a mold to obtain an injection molding lens. Functional polycarbonate lenses for sunglasses using this injection molding lens have been generally widespread (Patent Document 1).

It has been pointed out that these functional polycarbonate lenses have a problem in that, in a case where the lens is used in a frame for glasses formed by plastic containing a plasticizer such as cellulose acetate, the plasticizer in the frame for glasses is bled out to cause cracks in lenses configured by a polycarbonate resin. From these circumstances, disclosed is a polarizable laminate for sunglasses, or the like, in which a sheet formed by a polyamide resin is stretched to impart a retardation, thereby obtaining a protective layer (Patent Document 2).

CITATION LIST

Patent Document

Patent Document 1: JP H08-313701 A
Patent Document 2: JP 4739950 B2

SUMMARY OF THE INVENTION

Problem to be Solved by the Invention

An object of the present invention is to provide a polyamide functional sheet in which air bubbles are not generated or are considerably reduced in a polarizing and/or photochromic functional sheet when the polarizing and/or photochromic functional sheet is manufactured using a sheet or film formed by the above-described polyamide resin as a protective layer, and a polyamide functional lens using the polyamide functional sheet. Incidentally, in the present specification, a sheet and a film are not discriminated. That is, the sheet or the film is simply referred to as the sheet or simply referred to as the film in some cases, but these have the same meaning.

As described above, there is a demand for a functional sheet using a polyamide resin sheet as a protective layer because of chemical resistance of the polyamide resin. When a functional sheet is manufactured by changing a protective layer of a polycarbonate functional sheet having hitherto been manufactured to a polyamide resin sheet, the present inventors have observed generation of air bubbles at such a degree that the appearance of the sheet is impaired.

Manufacturing conditions except that an aromatic polycarbonate sheet is changed to a polyamide resin sheet are the same. Since air bubbles are observed after the protective layer is attached to the functional layer with an adhesive layer being interposed therebetween, the air bubbles are considered to be generated by reaction between the adhesive layer and the functional layer. The present inventors have studied a difference in physical properties between the aromatic polycarbonate sheet and the polyamide resin sheet, and as a result, have focused on the difference in gas barrier properties between the both sheets and conducted comparison examination. As a result, it becomes clear that the polyamide resin sheet has higher gas barrier properties than the aromatic polycarbonate sheet as shown in a low oxygen transmission rate.

That is, it is considered that gas generated by reaction between components of the adhesive layer and the functional layer is confined by the protective layer formed by the polyamide resin having high gas barrier properties, and as a result, air bubbles are generated.

If generation of air bubbles can be recognized during the manufacturing process, it is considered that the generation thereof is prevented by appropriately adjusting the cementing speed or stress of each layer in order to release the gas; however, it is difficult to specify a time point of generation of air bubbles and a manufacturing method in which this point has to be considered is not suitable for industrial manufacturing in terms of production efficiency.

In addition, regarding the adhesive, an adhesive used in manufacturing of the polycarbonate functional sheet by the present inventors is a thermosetting resin. In the invention of the present application, an adhesive layer formed by such a thermosetting resin can be stably used in heat bending and injection molding processes without being peeled off, and thus the adhesive layer is preferably used as long as air bubbles are not generated.

Solutions to the Problems

The inventors of the present application have found that generation of air bubbles that is problematic can be reduced or eliminated in the case of using a polyamide resin sheet exhibiting a predetermined oxygen transmission rate as a protective layer, thereby completing the invention of the present application. That is, the present invention is as follows.

(1) A polyamide functional sheet being obtained by disposing a protective layer formed by a transparent plastic sheet or film on at least one surface of a functional layer, which is a polyvinyl alcohol-based polarizing film layer, a photochromic layer, or a combination of these layers, with an adhesive layer being interposed therebetween, characterized in that the protective layer is a sheet or film formed by a polyamide resin, and an oxygen transmission rate at 23° C. and 85% RH is 50 cm$^3$/m$^2$·24 hr·bar or more.

In the invention of the above item (1), the polyamide functional sheet is characterized in that:

(2) the polyamide resin of the protective layer is a non-crystalline or microcrystalline polyamide;

(3) the adhesive layer is a urethane resin solvent-based adhesive; and (4) a retardation of the protective layer is 200 nm or less or 2,000 nm or more.

In addition, the present invention also relates to (5) a polyamide functional lens using the functional sheet described in the above items (1) to (4).

In addition, the present invention relates to (6) a method for manufacturing a polyamide functional lens, the method including a step of punching the functional sheet described in any one of the above items (1) to (4) into an individual lens piece, and a step of heat bending the lens piece.

In addition, the present invention relates to (7) a method for manufacturing a polyamide functional lens, the method including a step of punching the functional sheet described in any one of the above items (1) to (4) into an individual lens piece, a step of heat bending the lens piece, and a step of heat fusing a thermoplastic resin to a concave surface side of the sheet subjected to heat bending.

DESCRIPTION OF THE EMBODIMENTS (Functional Layer (Polarizing Film Layer))

A polarizing film to be used in a functional layer is a film to which polarization properties and a desired color tone are imparted by swelling a resin film formed by a base material in water, immersing the resin film in a dyeing solution containing a dichroic organic dye while being unidirectionally stretched to disperse the dichroic dye in the base resin in an oriented state.

As a resin serving as a base material for the polarizing film to be used in this case, polyvinyl alcohol are used, and as the polyvinyl alcohols, polyvinyl alcohol (hereinafter, PVA), PVA in which a slight amount of the acetic acid ester structure remains, PVA derivatives, or analogs such as polyvinyl formal, polyvinyl acetal, and saponified ethylene-vinyl acetate copolymer, and the like are preferred, and PVA is particularly preferred.

Further, regarding the molecular weight of the PVA, from the viewpoint of stretchability and film strength, the weight average molecular weight is preferably 50,000 to 350,000, more preferably a molecular weight of 100,000 to 300,000, and particularly preferably a molecular weight of 150,000 or more. The scaling factor of stretching of the PVA film is 2 to 8 times, preferably 3.5 to 6.5 times, and particularly preferably 4.0 to 6.0 times from the viewpoint of the dichroic ratio and film strength after stretching. The thickness of the PVA film after stretching is 10 μm or more, and preferably about 20 μm or more and 50 μm or less from the viewpoint that the PVA film can be handled without being integrated with a protective film or the like.

A typical manufacturing process in the case of using a PVA film as a base film is as follows:

(1) washing a PVA film with water to appropriately remove impurities while swelling the film in water;

(2) appropriately stretching the film;

(3) dyeing the film in a dyeing tank;

(4) subjecting the film to a cross-linking or chelation treatment with boric acid or a metal compound in a treatment tank; and (5) drying the film.

Incidentally, steps (2) and (3) (and optionally (4)) may be appropriately carried out with the order thereof being switched or at the same time.

First, in the swelling and washing step of the step (1), by absorbing water, a PVA film that is easily broken in a dry state at normal temperature is uniformly softened to be stretchable. Further, in this step, a water-soluble plasticizer or the like used in the manufacturing process of the PVA film is removed or optionally additives are preliminarily adsorbed. At this time, the PVA film is not uniformly and sequentially swollen and a variation in the degree of the swelling occurs. Even in this state, it is important to uniformly apply as small a force as possible to make uniform elongation and to avoid forming wrinkles. Further, in this step, it is most desirable that swelling simply is uniform, and excessive stretching should be minimized, since such stretching causes unevenness of the film.

In the step (2), generally stretching is carried out so as to have a draw ratio of 2 to 8 times.

In the present invention, maintaining good processability is important. Thus, it is preferable that the draw ratio of stretching of the PVA film is selected from 3.5 to 6.5 times, particularly from 4.0 to 6.0 times, and at this state, orientation of the PVA film is maintained.

The orientation relaxation of the PVA film in a stretch orientation state is advanced the longer it is in water and the longer the start of the drying step is prolonged. Thus, from the viewpoint of maintaining good properties, the time during stretching should be designed so as to be as short as possible. Further, after stretching, it is preferable that excess water is removed as soon as possible, that is, it is preferable that the PVA film is immediately introduced into the drying step to dry the PVA film without excess heat load.

The dyeing of the step (3) is accomplished by absorption or deposition of dyes to polymer chains of oriented polyvinyl alcohol-based resin film. From this mechanism, this step can be carried out before, at the same time as, or after the step for uniaxial stretching without making a major change. Since the interface is a surface with high restriction that can be easily oriented, it is preferable to select conditions that use this property.

The temperature is generally selected from high temperatures of 40 to 80° C. from the requirement of high productivity, but in the present invention, the temperature is generally selected from 25 to 45° C., preferably 30 to 40° C., and particularly 30 to 35° C.

The step (4) is carried out to improve heat resistance, water resistance, or organic solvent resistance.

The treatment with boric acid of the former improves heat resistance by cross-linking among PVA chains. This treatment can be carried out before, at the same time as, or after uniaxial stretching of the polyvinyl alcohol-based resin film without making a major change. Further, the metal compound of the latter is used to form dye molecules and chelate compounds to achieve stabilization, and generally, this step is carried out at or after the dyeing.

As the metal compound, transition metals belonging to Period 4, Period 5, and Period 6 may be used. Among such metal compounds, those whose effects of heat resistance and solvent resistance have been confirmed exist, but from the viewpoint of cost, metal salts such as acetates, nitrates, and sulfates of fourth-period transition metals such as chromium, manganese, cobalt, nickel, copper, and zinc are preferred. Among them, compounds of nickel, manganese, cobalt, zinc, and copper are further preferred since they are inexpensive and excellent in the above-described effects.

Regarding the contents of the metal compound and the boric acid in the polarizing film, from the viewpoint of imparting heat resistance and solvent resistance to the polarizing film, the metal content of the metal compound is preferably 0.2 to 20 mg and further preferably 1 to 5 mg per 1 g of the polarizing film. The boron content of the boric acid is preferably 0.3 to 30 mg and further preferably 0.5 to 10 mg.

The composition of the treatment solution to be used for the treatment is set so as to satisfy the above-described content, and generally, it is preferable that the concentration of the metal compound is 0.5 to 30 g/L and the concentration of the boric acid is 2 to 20 g/L.

Analysis of the contents of metal and boron in the polarizing film can be conducted using atomic absorption spectrometry.

Regarding the immersion temperature, generally, the same condition as in the dyeing is employed, but the temperature is selected from generally 20 to 70° C., preferably 25 to 45° C., more preferably 30 to 40° C., and particularly 30 to 35° C. Further, the immersion time is selected from 0.5 to 15 minutes.

In the step (5), the dyed and uniaxially stretched PVA film, which has been already stretched, dyed, and suitably treated with boric acid or metal compounds, is dried. The PVA film exhibits heat resistance that corresponds to the moisture content thereof. Thus, if the temperature increases when the PVA film has a high moisture content, the uniaxially stretched state gets out of order, in a shorter period. Therefore, the dichroic ratio of the PVA film is decreased.

Since the PVA film is dried from its surface, preferably, the PVA film is dried from both surfaces. This step is preferably carried out by ventilation with dry air while removing vapor. Further, as is well known in the related art, in view of preventing excess heating, a method in which evaporated moisture is immediately removed to accelerate evaporation is preferred from the viewpoint that drying can be performed while an increase in temperature is suppressed, and the temperature of the dry air is from the temperature that can substantially maintain the color of a polarizing film in a dried state to generally 70° C. or higher, preferably at a temperature of 90 to 120° C. for 1 to 120 minutes, preferably for 3 to 40 minutes.

The PVA film is manufactured such that the PVA moisture content after drying becomes generally 1 to 4 wt %.

(Functional Layer (Photochromic Layer))

As the functional layer of the present invention, a photochromic film, which is obtained by kneading a photochromic dye with a urethane-based film, or the like can be suitably used. In addition, a photochromic dye may be kneaded with an adhesive layer described below, and for example, by the following method, a photochromic layer, which is formed by a thermosetting polyurethane resin layer containing a photochromic compound, can be manufactured. Incidentally, the photochromic dye (photochromic compound) is not particularly limited as long as it is favorably compatible with a polyurethane polymer, and a commercially available organic photochromic compound can be used. In view of photochromic performance, a spiropyran-based compound, a spirooxazine-based compound, and a naphthopyran-based compound are preferably used.

A method for manufacturing a photochromic film used in the photochromic layer is exemplified. A photochromic compound is added to a solution, which is obtained by diluting a polyurethane polymer with a specific organic solvent, at a ratio of 0.2 to 5 wt % with respect to the resin solid content, 0.1 to 5 wt % of additives such as a hindered amine-based light stabilizer and/or an antioxidant with respect to the resin solid content are further added, and the resultant product is uniformly stirred and mixed. Thereafter, a curing agent is added and further stirred as a target that a ratio I/H of an isocyanate group (I) to a hydroxyl group (H) of the curing agent is 0.9 to 20, preferably 1 to 10, thereby forming a solution. The polymer concentration in the solution is generally and appropriately 40 to 90 wt %. The solution is applied to the rear surface of a transparent polycarbonate sheet provided with a coating layer on the surface by using a doctor blade to have an applied thickness of 50 to 1,000 μm. After application, heating and drying are conducted until the applied surface does not substantially contain the solvent, the rear surface of the transparent polycarbonate sheet provided with a coating layer on the other surface is pasted onto the applied surface of the synthetic resin sheet to form a sandwich shape, and the resultant product is further left to stand and is dried, thereby obtaining a photochromic film.

(Adhesive Layer)

In order to obtain a functional sheet by laminating the functional layer and the protective layer, an adhesive layer is interposed between the functional layer and the protective layer. Generally, as a material of an adhesive used in the functional sheet, there are mentioned a polyvinyl alcohol resin-based material, an acrylic resin-based material, a urethane resin-based material, a polyester resin-based material, a melamine resin-based material, an epoxy resin-based material, a silicone-based material, and the like.

In the present application, in the case of taking into consideration stability in heat bending and injection molding processes, a thermosetting material is preferred, particularly, a two-component thermosetting urethane resin composed of a polyurethane polymer, which is a urethane resin-based material, and a curing agent is preferred.

The polyurethane polymer is a compound obtained by reacting a diisocyanate compound and a polyoxyalkylene diol at a certain ratio, and is a compound having an isocyanate group at both terminals. As the diisocyanate compound used in the polyurethane polymer, diphenylmethane-4,4'-diisocyanate, tolylene diisocyanate, hexamethylene diisocyanate, isophorone diisocyanate, 4,4'-dicyclohexylmethane diisocyanate, lysine isocyanate, and hydrogenated xylylene diisocyanate can be used, and diphenylmethane-4,4'-diisocyanate is preferred. As the polyoxyalkylene diol, polypropylene glycol, polyethylene glycol, and polyoxytetramethylene glycol can be used, but polypropylene glycol having a polymerization degree of 5 to 30 is preferably used. The molecular weight of the polyurethane polymer is not particularly limited, but the number average molecular weight is generally 500 to 5,000, preferably 1,500 to 4,000, and more preferably 2,000 to 3,000.

Meanwhile, the curing agent is not particularly limited as long as it is a compound having two or more hydroxyl groups, and examples thereof include polyurethane polyol polyether polyol, polyester polyol, acryl polyol, polybutadiene polyol, polycarbonate polyol, and the like. Of them, a polyurethane polyol having a hydroxyl group at the terminals obtained from a specific isocyanate and a specific polyol is preferred. In particular, a polyurethane polyol having a hydroxyl group at least at both terminals derived from a diisocyanate compound and a polyol is preferred. As the diisocyanate compound, diphenylmethane-4,4'-diisocyanate, tolylene diisocyanate, hexamethylene diisocyanate, isophorone diisocyanate, 4,4'-dicyclohexylmethane diisocyanate, lysine isocyanate, and hydrogenated xylylene diisocyanate can be used, and tolylene diisocyanate is preferably used. In addition, as the polyol, those which are obtained by reacting trimethylolpropane or the like with ethylene oxide or propylene oxide can be used, and a polypropylene glycol derivative having a polymerization degree of 5 to 30 is preferably used. The molecular weight of the curing agent is not particularly limited, and the number average molecular weight is generally 500 to 5,000, preferably 1,500 to 4,000, more preferably 2,000 to 3,000.

In these polyurethane polymer and curing agent, solvents such as ethyl acetate and tetrahydrofuran can be used for controlling viscosity. In addition, in a case where photochromic function is imparted to the adhesive layer, use of solvents is an effective method for uniformly dispersing a photochromic compound in a urethane resin.

(Protective Layer)

In the functional sheet of the present invention, a protective layer (or a protective film or a protective film for a polarizing film) formed by a polyamide resin is formed on at least one surface of the functional sheet.

The polyamide resin is desirably a resin called non-crystalline polyamide or microcrystalline polyamide from the viewpoint of transparency and molding processability, and a polyamide resin, which can be subjected to injection molding processing, described later is preferred. That is, a polyamide resin that has thermoplasticity, exhibits melt fluidity, which enables the polyamide resin to be molded at a temperature equal to or lower than a pyrolysis temperature, and has an appropriate Tg (glass transition temperature) can be suitably used.

In the case of considering non-crystallinity as the condition, there is a limitation of an amount of a repeating unit involved in crystallinity, a structure providing steric hindrance is mentioned as an example of a molecular structure hindering crystallinity, and a branched structure, introduction of a substituent, or a bulky molecular structure such as cycloalkane is used.

In the condition of appropriate heat resistance, a structure with a large enthalpy in a repeating unit (unit molecule chain length) or a structure regulating a molecular movement in a repeating unit and between repeating units is essential, a typical example of the former is an aromatic series, and as a compound example of the latter, cycloalkane, cycloalkene, or the like having a structure in which an unsaturated bond of an aromatic nucleus is hydrogenated is used. In addition, since a material having an alicyclic structure has, as described above, heat resistance and a molecular structure hindering crystallinity, this material can be said to be a material that is effective for obtaining a functional sheet for sunglasses in which polyamide to be provided to heat bending or the like is used in a protective layer.

The polyamide generally has a constituent unit derived from a monomer such as diamine, dicarboxylic acid, or aminocarboxylic acid. An aromatic polyamide or an alicyclic polyamide is produced, in principle, by configuring a constituent unit derived from at least one monomer constituting whole aliphatic polyamide as an aromatic or alicyclic series. The whole or parts of these monomers are configured as an aromatic or alicyclic series, and a partially aromatic polyamide, an aromatic-partially alicyclic polyamide, a partially aromatic-partially alicyclic polyamide, a partially aromatic alicyclic polyamide, a partially alicyclic polyamide, or a combination thereof can be used in the invention of the present application, but a polyamide having an alicyclic structure can be suitably used as a typical example of a non-crystalline polyamide having non-crystallinity and appropriate heat resistance. Incidentally, in the case of taking into consideration optical properties such as retardation described later, it is desirable to contain an aromatic part.

As a matter of course, in order to cope with oxidation degradation of the polyamide and processing failure, an additive such as a lubricant or an antioxidant is used in the polyamide resin used in the present invention.

When the functional sheet of the present invention is used as an individual lens piece, and this lens piece is subjected to heat bending, and as necessary, is integrated by injection fusing a thermoplastic resin at the concave surface side thereof to thereby obtain a polyamide functional lens, optical distortion may occur. That is, when the functional lens is obliquely seen, rainbow-colored "color unevenness" is observed, or when the curved polarizing plate is observed while overlapping a planar polarizing plate such that polarization axes thereof are disposed to take perpendicular positions, transmission of light, so-called "polarized light leakage" is observed. The reasons for these are as follows. Since a birefringence of a resin used in the protective layer is large, that is, an intrinsic birefringence index or a photoelastic coefficient is large, a retardation value (definition: birefringence $\Delta n \times$ thickness d) increases (for example, 300 nm to 1,200 nm, or the like) by stress at the time of melt extrusion molding or at the time of heat bending, and polarized light in the polarizing film layer provided in the inner layer is disturbed, so that a defect such as "polarized light leakage" described above is observed in a surface that becomes a concave surface of a lens after processing. In addition, when the lens is obliquely observed, coloring interference stripes are observed as "color unevenness" in the convex surface.

From the above description, regarding the protective layer, it is desirable to dispose the protective layer, which has such a degree of a retardation value that does not inhibit the function of the polarizing film layer provided in the inner layer (for example, 300 nm or less, preferably 200 nm or less, and more preferably 100 nm or less) at least at a position that becomes a convex surface after lens processing.

In the case of having such a low retardation, the thickness of the protective layer is set to desirably 100 μm or less and preferably 80 μm or less. In addition, a film manufactured by a casting method in which a molecular orientation is more difficult to prompt can be suitably used as a protective layer, but even in the casting method, an attention is needed not to increase a retardation value due to the generation of unnecessary stress at the time of taking-out.

Further, in a case where a film is manufactured such that the thickness is 100 μm or less and the retardation is the small value described above like the above-described cast film, when the polyamide resin contains no aromatic part, an intrinsic birefringence value is easily kept small, and even in the heat bending described later, an increase in the retardation value is easily suppressed.

Alternatively, in a method other than the method in which a retardation value is maintained to be small, conversely, by disposing a protective layer in which a retardation value is set to extremely large, for example, 1,300 nm or more, preferably 2,000 nm or more, and more preferably 3,000 nm or more on the convex surface after processing the sheet into a lens, phenomenon such as "color unevenness" or "polarized light leakage" can be made difficult to recognize by the naked eye at such a degree that the phenomenon is not problematic.

In a case where the retardation value excessively increases in this way, it is necessary to subject the protective layer formed by a polyamide resin to stretching treatment. In this case, a method is desirable in which a sheet molded by a melt extrusion method or the like to have a certain degree of thickness, for example, 100 μm or more, preferably 150 μm or more, more preferably 200 μm or more, and further preferably 300 μm or more is stretched to form a protective film having a desired retardation value and a desired thickness. Incidentally, in the invention of the present application, the retardation value is an internal retardation value. It is within the knowledge of those of ordinary skill in the art that the internal retardation value is derived from a refractive index in the slow axis direction, a refractive index in the fast axis direction, and a thickness of the film when the incident linearly polarized light is decomposed into the slow axis and the fast axis. Incidentally, in the present disclosure, the retardation value is a value measured at 590 nm. As a measurement apparatus, a retardation measurement apparatus: RETS-100 manufactured by Otsuka Electronics Co., Ltd., or the like is mentioned.

In order to increase a retardation value by stretching a film molded by a melt extrusion method, a draw stretching method in which the film is taken off while being stretched at the time of being taken off, an offline stretching method in which the film is wound once after molding and separately stretched, and the like are exemplified.

In the melt extrusion molding method, for example, a polyamide sheet can be manufactured by melting and mixing the polyamide resin or a resin constituting the protective layer by an extruder or the like, extruding and molding the resin from a die (for example, a T die or the like), and cooling the resin. The resin temperature when the polyamide resin or a resin constituting the protective layer is melted and molded (melt molded) can be selected from generally a temperature range of about 120° C. to 350° C., for example, 130 to 300° C., preferably 150 to 280° C., and further preferably about 160 to 250° C. At this time, the stretching treatment can be performed by increasing the withdrawing speed higher than a speed of the cooling roll.

A specific stretching method is not particularly limited unless the performance of the functional sheet of the present invention is inhibited. It is preferable that in order to suppress stretching unevenness, the roll of the stretching portion maintains a certain resin temperature while the roll is appropriately heated by a mold temperature regulator or the like. In general, stretching in which a favorable outer appearance as a sheet for sunglasses is maintained can be performed near Tg of the polyamide resin. Regarding the resin temperature, in a case where stretching is performed in a temperature zone lower than Tg of the polyamide resin to be used, stretching unevenness in which the sheet is not uniformly stretched easily occurs, and uneven patterns are generated in stretched places and unstretched places. Further, in a case where stretching is performed in a temperature zone higher than Tg, adhesion of the polyamide film or sheet to the roll occurs, so that a problem arises in that a trace remains when the film or sheet is peeled off from the roll. It is necessary to select the conditions of the roll and other temperature regulators while appropriately also taking into consideration a relation with retardation described later.

Incidentally, Tg described in the invention of the present application indicates an intermediate point temperature among a start point, an intermediate point, and an end point temperature in the Tg curve in the case of measurement by DSC.

Further, the resin temperature of the protective layer sheet at the time of stretching also has a relation with imparting of retardation. When the stretching treatment is performed at a resin temperature of the film or sheet at the time of stretching in a temperature zone lower than Tg of the resin which is used, a higher retardation is easily imparted, and as a temperature increases, the retardation is difficult to exert. Furthermore, after stretching, it is preferable to perform cooling as fast as possible, and according to this, retardation and an angle between the slow axis and the fast axis can be fixed.

Further, in a case where stretching is performed in a temperature zone lower than Tg, this may affect a problem such as contraction after sheet molding, so that it is essential to select the stretching temperature condition in consideration of this point. Conversely, in a case where stretching is performed at a resin temperature higher than Tg, an influence of necking-in to the sheet during stretching increases to affect the thickness distribution, and a variation in retardation and fast axis angle may increase, so that it is necessary to pay attention to an excessive increase in draw ratio of stretching.

In a case where the polyamide resin molded by a melt extrusion method is stretched to obtain a protective layer, it is desirable to use a polyamide resin containing an aromatic component. According to this, an intrinsic birefringence value as a resin increases, a high retardation is easily exhibited with a lower stress, and the retardation is easily maintained even when the resin is stretched at a resin temperature higher than Tg.

As described above, since an intrinsic birefringence value varies depending on a composition of the polyamide resin and a desired retardation value, it is essential to appropriately adjust a draw ratio of stretching in the stretching treatment. Incidentally, generally, the draw ratio of stretching needs to be 1.1 times at the minimum, preferably 1.2 times, and more preferably 1.3 times or more. As the draw ratio increases, necking-in is promoted, or the upper limit of the draw ratio is determined from the viewpoint of production efficiency from the reason such as occurrence of breaking risk. The draw ratio is generally about 2.2 times and preferably about 2.0 times or less.

In the invention of the present application, it is found that there is a significant relation between gas barrier properties of the protective layer, which is formed by a polyamide resin, and the generation of air bubbles. As also mentioned in the section of the problem, a cause of the generation of air bubbles is considered to be gas generated after the protective layer, the adhesive layer, and the functional layer are laminated.

As compared to an aromatic polycarbonate resin that has been hitherto generally used as the protective layer of the polarizing sheet for sunglasses, the protective layer formed by a polyamide resin has high gas barrier properties. In particular, regarding polyamide and the like including, as a structure of the polyamide resin, those which have high regularity, for example, those which have (1,4-dicarboxybenzene) terephthalate or 1,4-diaminobenzene as a monomer, bonds thereof lie in the same plane in a plain plate shape and an aggregate having high regularity and small gas transmission is easily formed, so that gas barrier properties tend to be enhanced. Also taking into consideration this point, the composition of the polyamide resin sheet has to be selected.

Further, as a matter of fact, the gas barrier properties of the protective layer are considerably affected by the thickness of the protective layer and the conditions of the stretching treatment. Even in the case of a protective layer having such gas barrier properties that no air bubbles are generated in an unstretched state, as the draw ratio of stretching increases, the molecular orientation is prompted, and in the protective layer cooled and fixed in such a state, gas barrier properties in which air bubbles are generated may be exhibited.

Incidentally, other than the oxygen transmission rate, the vapor transmission rate, and the like, there are various index for gas barrier properties, but in the present application, since a relation between the oxygen transmission rate and the generation of air bubbles is found, the oxygen transmission rate is employed in the invention of the present application. An evaluation method of the oxygen transmission rate is compliant with DIS/ISO 15105-1.

From the above description, it is important in the present application to use a protective layer showing a certain degree or more of the oxygen transmission rate, and the thickness and the degree of stretching of the protective layer can be determined in consideration of the specification of finished products and the oxygen transmission rate.

In the present application, in a case where the oxygen transmission rate of the protective layer at 23° C. and 85% RH is about 10 cm$^3$/m$^2$·24 hr·bar, the generation of air bubbles becomes significant and thus the resulting product cannot withstand use as a functional sheet.

In the case of suppressing the generation of air bubbles, the oxygen transmission rate of the protective layer is desirably 50 cm$^3$/m$^2$·24 hr·bar or more, 60 cm$^3$/m$^2$·24 hr·bar or more, 70 cm$^3$/m$^2$·24 hr·bar or more, 90 cm$^3$/m$^2$·24 hr·bar or more, 110 cm$^3$/m$^2$·24 hr·bar or more, 130 cm$^3$/m$^2$·24 hr·bar or more, or 150 cm$^3$/m$^2$·24 hr·bar or more. Alternatively, the oxygen transmission rate thereof may be 400 cm$^3$/m$^2$·24 hr·bar or more, 410 cm$^3$/m$^2$·24 hr·bar or more, 420 cm$^3$/m$^2$·24 hr·bar or more, or 430 cm$^3$/m$^2$·24 hr·bar or more. Incidentally, from the spirit of the invention of the present application, as long as the protective layer is a protective layer enabling a favorable lens to be molded, the upper limit of the oxygen transmission rate of the protective layer is not particularly important. It is necessary to select combinations of conditions such as the composition of the resin, the thickness of the protective layer, and the stretching treatment, in consideration of this point.

(Preparation of Functional Sheet)

The above-described polarizing film layer is used as a functional layer, the adhesive layer is applied by a gravure coater, a die coater, or the like, both surfaces of the protective layer are pasted to each other, and the resulting product is cut into a desired length, thereby capable of obtaining a functional sheet. The lamination method is not particularly limited, but in order to avoid incorporation of air bubbles caused by shortage of an application liquid at the time of applying an adhesive, a sufficient ejection amount is maintained. In addition, it is desirable to appropriately control the tension at the time of pasting, the nip pressure of a lamination roll, and the like in consideration of the warpage state of the sheet after pasting, and the like.

(Preparation of Functional Lens)

Next, the functional sheet is punched into an individual lens piece, and the obtained individual lens piece is subjected to curved surface processing, and as necessary, is inserted into an injection molding machine to inject a thermoplastic resin into a concave surface side of the individual lens piece, thereby obtaining a functional lens.

In the punching, generally, a punching blade that is made of a Thomson blade can be used. A plurality of individual lens pieces is generally obtainable from one functional sheet by the punching. The shape of the individual lens piece is appropriately selected based on shapes of finished products (such as sunglasses and goggles). A typical lens-shaped product for two eyes is a disk having a diameter of 80 mm or a slit shape that is cut in the same width at both ends in a direction perpendicular to the polarization axis.

In the punching, the polarizing film layer, the adhesive layer, the protective layers on both surfaces, and the protective films on both surfaces do not break excessively, thus, generation of minute broken fragments, propagation of cracks in the stretching direction, and whether excessive deformated elongation occurs are targets of a study. Therefore, an appropriate level of stickness is needed. At this time, a method that uses an appropriately moisturized sheet is also recommendable in order to prevent generation of minute broken fragments as a result of destruction of polarizing film layer caused by being dried and punched.

Next, the individual lens piece is subjected to a preliminary drying treatment and then heat-bent to have a spherical surface or an aspherical surface under heating so as to prepare a heat-bent sheet. The conditions for preliminary drying are selected such that color change does not occur after heat bending of the individual lens piece. Generally, air drying at 60 to 80° C. and preferably at 65 to 75° C. is performed for 8 hour or longer and preferably for about 24 hours.

The individual lens piece is heat-bent along a surface of a mold. The mold may be a mold used for injection molding. The heat bending is to generally form a flat individual lens piece into a three-dimensional curved surface such as a partial spherical surface or an elliptical surface in some cases. This processing in which a minimum amount of energy accompanying the deformation is employed involves contraction. In a case where smooth contraction is inhibited, waves and, furthermore, wrinkles occur and good-quality products cannot be produced. Thus, in order to ensure smooth contraction, the temperature, the load, and the like are preferably gradually controlled.

Regarding the heating temperature, a temperature equal to or higher than a temperature 50° C. lower than the glass transition temperature of the polyamide resin used in the protective sheet but lower than the glass transition temperature is selected as the processing temperature. The heating temperature is preferably a temperature equal to or higher than a temperature 25° C. lower than the glass transition temperature of the polyamide resin and more preferably a temperature equal to or higher than a temperature 20° C. lower than the glass transition temperature thereof but equal to or lower than a temperature 5° C. lower than the glass transition temperature.

Regarding processing conditions in the case of injection molding, it is essential that a lens with an excellent outer appearance can be manufactured. Therefore, conditions for injection molding that can obtain lens molding articles having a high filling ratio in such a range that burr does not occur, for example, injection pressure, holding pressure, weighing, molding cycle, and the like are appropriately selected. The temperature of the resin depends on the melting temperature of the polyamide resin or the composition of the polyamide resin, but is generally selected from 230 to 320° C. and preferably 250 to 300° C. The injection pressure is appropriately selected from 50 to 200 MPa.

Further, the temperature of the mold is selected from a temperature equal to or higher than a temperature 100° C. lower than Tg of the polyamide resin to a temperature lower than Tg, and is preferably 70 to 120° C.

The thermoplastic resin used for injection molding is preferably a polyamide resin and more preferably a resin called non-crystalline polyamide. The thermoplastic resin may be a thermoplastic resin that has thermoplasticity, exhibits melt fluidity, which enables the thermoplastic resin to be molded at a temperature equal to or lower than a pyrolysis temperature, and has an appropriate Tg (glass transition temperature), but it is preferable to select the same resin as the polyamide resin used in a functional sheet or a polyamide resin having a refractive index close to that of the polyamide resin used in a functional sheet such that an outer appearance of an interface with a functional sheet is not impaired.

The functional lens manufactured above is appropriately subjected to a hard coating treatment, and further subjected to mirror coating, antireflection coating, or the like to obtain a product.

Regarding the materials for hard coating or the processing conditions, an excellent outer appearance and adhesiveness with respect to polyamide at the base or inorganic layers such as a mirror coat and an antireflection coat to be subsequently coated are required. From this point, the firing temperature of the hard coating is preferably a temperature equal to or higher than a temperature 50° C. lower than the glass transition temperature of the polyamide resin and a temperature lower than the glass transition temperature, particularly, more preferably a temperature equal to or higher than a temperature 40° C. lower than the glass transition temperature and a temperature lower than a temperature 15° C. lower than the glass transition temperature, and most preferably a temperature lower than around 30° C. The firing time of the hard coating is approximately 0.5 to 2 hours.

The functional lens manufactured above is processed into sunglasses, goggles, and the like that are finished products by lens manufacturers and sold, or processed by individual dealers (retail stores) into various products by conducting lens edging, hole-forming, screw tightening, and the like, and sold as sunglasses, goggles, and the like.

EXAMPLES (Evaluation of Air Bubble Defect)

Regarding polarizing sheets prepared by procedures described below, whether or not air bubbles are generated was evaluated before the polarizing sheets were processed to lenses described below. Sheets cut into a size of 20×15 cm were observed, sheets with seven or more air bubbles having a major axis of 50 μm or more per one sheet being observed were denoted as ×, sheets with less than seven air bubbles being observed were denoted as ○, sheets with no air bubbles were denoted as ⊙, and then the results were put together as in Table 2.

(Evaluation of Polarizing Lens)

After the polarizing sheet was prepared, a polyamide resin was subjected to injection molding in the polarizing sheet to prepare an injection molding lens. Since lots of air bubbles were generated in the polarizing sheet of each of Comparative Examples described later in preparation of an injection molding lens, preparation of lenses was not performed. All of injection polarizing lenses of Examples had favorable outer appearance at such a degree that the lenses can be used as products.

(Preparation of Polarizing Film)

Next, a polyvinyl alcohol film (manufactured by Kuraray Co., Ltd.) was swollen in water set at 35° C., then dyed in an aqueous solution set at 35° C. containing dichroic dye Kayarus Blue G (C.I. Blue 78), SUMILITE Red 4B (C.I. Red 81), Chrysophenine (C.I. Yellow 12), and 10 g/L of anhydrous sodium sulfate, immersed in an aqueous solution set at 35° C. containing 2.5 g/L of nickel acetate and 5 g/L of boric acid, and finally stretched to be a draw ratio of stretching 4 times. This film was subjected to the heating treatment at 110° C. for 3 minutes in a state of a tension state being held, and thus a polarizing film was obtained and stored in a low-humidity storage until the next step.

(Preparation of Polyamide Sheet)

(PA1): A polyamide sheet (hereinafter, described as PA1) having a Tg of 155° C. and a thickness of 200 μm was prepared by a melting extrusion method in which non-crystalline transparent aliphatic and alicyclic polyamide resins (EMS-CHEMIE Ltd., Grilamid TR90) were heated and melted to extrude the molten resin by a short-screw extruder from a T die, and the extruded resin was cooled by a cooling roll and then wound by a winding machine. Incidentally, all of manufacture polyamide sheets were stored in a low-humidity storage immediately after manufacturing.

(PA2): A polyamide sheet (hereinafter, described as PA2) having a Tg of 160° C. and a thickness of 200 μm was obtained in the similar manner to PA1, except that non-crystalline transparent aliphatic, alicyclic, and aromatic polyamide resins (EMS-CHEMIE Ltd., Grilamid TR55) were used.

(PA3): A polyamide sheet obtained in the similar manner to PA1, except that the thickness was changed to 250 μm, was cut into 10 cm square, held at a Tg (intermediate point in DSC measurement) temperature of PA1 for 20 minutes while four corners were fixed with a clamp, then stretched at a draw ratio of stretching 1.3 times only in an uniaxial direction, and cooled at room temperature for 30 minutes while holding a tension state after stretching, thereby obtaining a stretched polyamide sheet (hereinafter, described as PA3) having a retardation of 2,000 nm.

(PA4): A stretched polyamide sheet (hereinafter, described as PA4) was obtained in the similar procedure to PA3, except that a polyamide sheet obtained in the similar manner to PA2, except that the thickness was changed to 250 μm, was used and a draw ratio of stretching was changed to 1.2 times.

(PA5): The same transparent polyamide resin as PA1 used above was molded by a casting method to have a thickness of 80 μm, thereby obtaining a polyamide sheet (hereinafter, described as PA5).

(PA6): A polyamide sheet (hereinafter, described as PA6) having a Tg of 125° C. and a thickness of 200 μm was obtained in the similar manner to PA1, except that non-crystalline transparent aliphatic and aromatic polyamide resins (EMS-CHEMIE Ltd., Grivory G21) were heated and melted for use.

(PA7): A polyamide sheet obtained in the similar manner to PA6, except that the thickness was changed to 250 μm, was stretched in the similar procedure to PA3, thereby obtaining a stretched polyamide sheet (hereinafter, described as PA7).

(PA8): A polyamide sheet obtained in the similar manner to PA1, except that the thickness was changed to 530 μm, was used, and the polyamide sheet was stretched in the similar procedure to PA3, except that the draw ratio of stretching was changed to 2.0 times, thereby obtaining a stretched polyamide sheet (hereinafter, described as PA8).

(PA9): A polyamide sheet (hereinafter, described as PA9) having a Tg of 150° C. and a thickness of 300 μm was obtained in the similar manner to PA1, except that non-crystalline transparent aliphatic and alicyclic polyamide resins (Arkema S.A., RILSAN CLEAR G850 Rnew) were heated and melted for use.

(PA10): A polyamide sheet obtained in the similar manner to PA9, except that the thickness was changed to 450 μm, was used, and the polyamide sheet was stretched in the similar procedure to PA3, except that the draw ratio of stretching was changed to 2.0 times, thereby obtaining a stretched polyamide sheet (hereinafter, described as PA10).

Incidentally, the details of the polyamide sheets were collected in Table 1. The measurement of the oxygen transmission rate was conducted at 23° C. and 85% RH using OX-TRAN 2/61 (manufactured by MOCON Inc.). The retardation value is a value obtained by measurement at a wavelength of 590 nm using a retardation measurement apparatus: RETS-100 manufactured by Otsuka Electronics Co., Ltd.

(Preparation of Functional Sheet)

Example 1

A thermosetting polyurethane-based adhesive was applied to PA3 obtained above, the polarizing film obtained above was laminated thereon, and PA3 was similarly laminated on the remaining one surface of the polarizing film. After lamination, the resultant laminate was left to stand in a constant-temperature bath set at 70° C. and the adhesive was cured, thereby obtaining a functional sheet.

Regarding both surfaces of the functional sheet prepared in the above-described procedure, when the aforementioned air bubbles were observed and evaluated, particularly, air bubble defect was very minute and did not affect lens processing.

Subsequently, the functional sheet obtained above was cut into a slit shape having a width of 55 mm in which both sides of a straight line passing through the center of a disk having a diameter of 80 mm were cut with the same amount in parallel, and then was preliminarily heated at an atmospheric temperature of 125° C., the female mold was a 6R-equivalent (radius: about 65.6 mm) partial sphere, the surface temperature was 135° C., the length of time the silicon rubber male mold was pressed was 4 seconds, the sheet was adsorbed to the female mold by vacuuming, and the sheet was held for 8 minutes under an atmosphere in which hot air having a temperature of 150° C. was blown, thereby obtaining a heat-bent polarizing sheet.

The heat-bent functional sheet was subjected to injection molding for plano lenses with no focusing power.

The heat-bent functional sheet manufactured above was placed in a mold cavity of an injection molding machine and subjected to injection molding by using a polyamide resin (EMS-CHEMIE Ltd., Grilamid, TR-90). Regarding the injection molding conditions, the resin temperature was set to 310° C., the injection pressure was set to 125 MPa, the hold pressure was set to 63 MPa, the mole temperature was set to 80° C., and the injection cycle was set to 70 seconds.

As a result, a polyamide polarizing lens with a favorable outer appearance was obtained.

Example 2

A functional sheet was obtained in the similar manner to Example 1, except that PA4 was used for both surfaces of the polarizing film. Thereafter, when air bubble defect was observed and evaluated, the air bubble defect was minute and did not affect lens processing. In addition, as a result of performing the lens processing in the similar manner to Example 1, there was no particular defect, and a favorable polyamide polarizing lens was obtained.

Example 3

A functional sheet was obtained in the similar manner to Example 1, except that PA3 was used for one surface of the polarizing film and PA1 was used for the remaining one surface. Thereafter, in the observation evaluation of air bubbles, there were not air bubbles. In addition, as a result of performing the lens processing in the similar manner to Example 1 while PA3 was set as the convex surface of the lens, there was no particular defect, and a favorable polyamide polarizing lens was obtained.

Example 4

A functional sheet was obtained in the similar manner to Example 3, except that 0.25 g of a spiropyran-based photochromic dye was added to an adhesive layer at the one side to prepare a photochromic layer. Thereafter, when air bubbles were observed and evaluated, the air bubbles were not observed. In addition, as a result of performing the lens processing in the similar manner to Example 3, there was no particular defect, and a favorable polyamide polarizing lens was obtained.

Example 5

A functional sheet was obtained in the similar manner to Example 1, except that PA5 was used for one surface of the polarizing film and PA1 was used for the remaining one surface. Thereafter, when air bubbles were observed and evaluated, the air bubbles were not observed. In addition, as a result of performing the lens processing in the similar manner to Example 1 while PA5 was set as the convex surface of the lens, there was no particular defect, and a favorable polyamide polarizing lens was obtained.

Example 6

A functional sheet was obtained in the similar manner to Example 1, except that PA8 was used for one surface of the polarizing film and PA1 was used for the remaining one surface. Thereafter, when air bubbles were observed and evaluated, the air bubbles were not observed. In addition, as a result of performing the lens processing in the similar manner to Example 1 while PA8 was set as the convex surface of the lens, there was no particular defect, and a favorable polyamide polarizing lens was obtained.

Example 7

A functional sheet was obtained in the similar manner to Example 1, except that PA10 was used for one surface of the polarizing film and PA9 was used for the remaining one surface. Thereafter, when air bubbles were observed and evaluated, the air bubbles were not observed. In addition, as a result of performing the lens processing in the similar manner to Example 1 while PA10 was set as the convex surface of the lens, there was no particular defect, and a favorable polyamide polarizing lens was obtained.

Comparative Example 1

A functional sheet was obtained in the similar manner to Example 1, except that PA7 was used for both surfaces of the polarizing film. Thereafter, when air bubbles were observed, air bubbles were often generated, and the functional sheet was not suitable for processing to lenses.

Comparative Example 2

A functional sheet was obtained in the similar manner to Example 1, except that PA7 was used for one surface of the polarizing film and PA6 was used for the remaining one surface. Thereafter, when air bubble defect was observed and evaluated, air bubbles were frequently generated, and the functional sheet was not suitable for processing to lenses.

TABLE 1

Preparation of polyamide sheet

| Polyamide sheet | Constituent | | | Thickness μm | Oxygen transmission rate (cm³/m² 24 hr bar) | Stretching | Re value nm |
|---|---|---|---|---|---|---|---|
| PA1 | Aliphatic | Alicyclic | — | 200 | 170 | No | 20 |
| PA2 | Aliphatic | Alicyclic | Aromatic | 200 | 90 | No | 30 |
| PA3 | Aliphatic | Alicyclic | — | 200 | 130 | Yes | 2000 |
| PA4 | Aliphatic | Alicyclic | Aromatic | 200 | 60 | Yes | 2000 |
| PA5 | Aliphatic | Alicyclic | | 80 | 430 | No | 3 |
| PA6 | Aliphatic | | Aromatic | 200 | 3 | No | 35 |
| PA7 | Aliphatic | | Aromatic | 200 | 2 | Yes | 2000 |
| PA8 | Aliphatic | Alicyclic | — | 350 | 90 | Yes | 6000 |
| PA9 | Aliphatic | Alicyclic | — | 300 | 75 | No | 35 |
| PA10 | Aliphatic | Alicyclic | — | 300 | 60 | Yes | 6200 |

TABLE 2

Preparation of functional sheet

| | Configuration | | Functional layer | Adhesive layer | Outer appearance | | |
|---|---|---|---|---|---|---|---|
| | Convex surface | Concave surface | | | Air bubbles | After bending | After molding |
| Example | | | | | | | |
| 1 | PA3 | PA3 | Polarizing layer | Urethane-based | ○ | Good | Good |
| 2 | PA4 | PA4 | Polarizing layer | Urethane-based | ○ | Good | Good |
| 3 | PA3 | PA1 | Polarizing layer | Urethane-based | ⊙ | Good | Good |
| 4 | PA3 | PA1 | Polarizing and photochromic layers | Urethane-based | ⊙ | Good | Good |
| 5 | PA5 | PA1 | Polarizing layer | Urethane-based | ⊙ | Good | Good |
| 6 | PA8 | PA1 | Polarizing layer | Urethane-based | ⊙ | Good | Good |
| 7 | PA10 | PA9 | Polarizing layer | Urethane-based | ⊙ | Good | Good |
| Comparative Example | | | | | | | |
| 1 | PA7 | PA7 | Polarizing layer | Urethane-based | X | | |
| 2 | PA7 | PA6 | Polarizing layer | Urethane-based | X | | |

The invention claimed is:

1. A polyamide functional sheet being obtained by disposing a protective layer formed by a transparent plastic sheet or film on both surfaces of a functional layer, which is a polyvinyl alcohol-based polarizing film layer, a photochromic layer, or a combination of these layers, with an adhesive layer being interposed therebetween, wherein
the protective layer is a sheet or film formed by a non-crystalline or microcrystalline polyamide resin, and
an oxygen transmission rate at 23° C. and 85% RH is 50 cm³/m²·24 hr·bar or more,
wherein the adhesive layer is formed by a urethane resin-based adhesive, and
one of the transparent plastic sheet or film is stretched and the other transparent plastic sheet or film is not stretched.

2. The polyamide functional sheet according to claim 1, wherein a retardation value of the protective layer is 200 nm or less or 2,000 nm or more.

3. A polyamide functional lens using the functional sheet according to claim 1.

4. A method for manufacturing a polyamide functional lens, the method comprising: punching the functional sheet according to claim 1 into an individual lens piece; and heat bending the lens piece.

5. A method for manufacturing a polyamide functional lens, the method comprising: punching the functional sheet according to claim 1 into an individual lens piece; heat bending the lens piece; and heat fusing a thermoplastic resin to a concave surface side of the sheet subjected to heat bending.

* * * * *